US010065667B2

United States Patent
Matsue et al.

(10) Patent No.: US 10,065,667 B2
(45) Date of Patent: Sep. 4, 2018

(54) CARRIER APPARATUS (71) Applicant: NIPPON SOKEN, INC., Nishio, Aichi-Pref. (JP)

(72) Inventors: Takenori Matsue, Nishio (JP); Koji Kawasaki, Nishio (JP); Michihiro Matsuura, Nishio (JP); Masami Kurosaka, Nishio (JP); Naoya Katoh, Kariya (JP)

(73) Assignee: SOKEN, INC., Nishio, Aichi-pref. (JP)

( * ) Notice: Subject to any disclaimer, the term of this patent is extended or adjusted under 35 U.S.C. 154(b) by 0 days.

(21) Appl. No.: 15/219,307

(22) Filed: Jul. 26, 2016

(65) Prior Publication Data

US 2018/0029624 A1 Feb. 1, 2018

(51) Int. Cl.
| | |
|---|---|
| *B62B 5/00* | (2006.01) |
| *B62B 3/02* | (2006.01) |
| *B62D 51/04* | (2006.01) |
| *B62B 5/06* | (2006.01) |
| *A45C 5/14* | (2006.01) |
| *A45C 13/26* | (2006.01) |

(52) U.S. Cl.
CPC .............. *B62B 5/0033* (2013.01); *B62B 3/02* (2013.01); *B62D 51/04* (2013.01); *A45C 5/14* (2013.01); *A45C 13/262* (2013.01); *B62B 5/005* (2013.01); *B62B 5/061* (2013.01)

(58) Field of Classification Search
CPC ... B62B 5/0026; B62B 5/0033; B62B 5/0036; B62B 5/005; B62B 5/02; B62B 5/026; B62B 3/02; B62D 51/04
See application file for complete search history.

(56) References Cited

U.S. PATENT DOCUMENTS

| | | | | |
|---|---|---|---|---|
| 5,791,425 A | * | 8/1998 | Kamen | ..................... A61G 5/04 180/21 |
| 6,336,642 B1 | * | 1/2002 | Carstens | ................... B62B 5/02 180/8.2 |
| 6,571,892 B2 | * | 6/2003 | Kamen | ................ G05B 13/042 180/21 |

(Continued)

FOREIGN PATENT DOCUMENTS

| | | | | |
|---|---|---|---|---|
| DE | 10113635 A1 | * | 12/2002 | ............. A61G 5/061 |
| FR | 2881710 A1 | * | 8/2006 | ........... A45C 13/385 |

(Continued)

*Primary Examiner* — Joseph M Rocca
*Assistant Examiner* — Maurice L Williams
(74) *Attorney, Agent, or Firm* — Harness, Dickey & Pierce, P.L.C.

(57) ABSTRACT

Driving wheels and non-driving wheels are installed to a lower portion of a case body. The driving wheels are driven by drive devices, respectively. A control device controls a drive operation of the drive devices. An angle sensing device senses a tilt angle of the case body about a rotational axis of the driving wheels. In a case where the tilt angle of the case body, which is sensed with the angle sensing device, is equal to or larger than a predetermined tilt angle in a state where the driving wheels contact a ground while the non-driving wheels are lifted away from the ground, the control device controls the drive devices in such a manner that the case body is held in a self-standing state with the driving wheels while keeping the non-driving wheel away from the ground.

10 Claims, 7 Drawing Sheets

(56) References Cited

U.S. PATENT DOCUMENTS

| | | | | |
|---|---|---|---|---|
| 6,799,649 B2* | 10/2004 | Kamen | A61G 5/061 | 180/8.2 |
| 7,703,568 B2* | 4/2010 | Ishii | A63C 17/12 | 180/218 |
| 2003/0111279 A1* | 6/2003 | Morrell | A61G 5/04 | 180/8.2 |
| 2004/0015266 A1* | 1/2004 | Skoog | B25J 5/007 | 700/245 |
| 2005/0252700 A1* | 11/2005 | Kitauchi | B60L 11/1877 | 180/65.1 |
| 2008/0067762 A1* | 3/2008 | Rembos | A61G 5/02 | 280/5.22 |
| 2009/0301833 A1* | 12/2009 | Hymas | A45C 5/14 | 190/18 A |
| 2010/0070132 A1* | 3/2010 | Doi | B60L 15/20 | 701/36 |
| 2010/0292840 A1* | 11/2010 | Ruan | B25J 5/007 | 700/259 |
| 2011/0015842 A1* | 1/2011 | Kume | B62B 5/0026 | 701/67 |
| 2012/0160577 A1* | 6/2012 | Anasiewicz | B62D 51/04 | 180/19.1 |
| 2013/0186698 A1* | 7/2013 | Sarokhan | B62B 5/026 | 180/7.1 |
| 2014/0116792 A1* | 5/2014 | Ueda | A61G 5/061 | 180/8.3 |
| 2015/0061240 A1* | 3/2015 | Segawa | A61G 5/107 | 280/5.28 |
| 2015/0066242 A1* | 3/2015 | Tanaka | A61H 3/04 | 701/1 |
| 2015/0181998 A1* | 7/2015 | Yamamoto | A45C 5/14 | 190/18 A |
| 2015/0183482 A1 | 7/2015 | Kubo et al. | | |
| 2016/0039445 A1* | 2/2016 | Sommers | B62B 5/0036 | 180/19.1 |
| 2016/0176429 A1* | 6/2016 | Shirato | A61H 3/04 | 701/22 |
| 2016/0221595 A1* | 8/2016 | Hane | A61H 3/04 | |
| 2017/0001656 A1* | 1/2017 | Katayama | B62B 5/0069 | |
| 2017/0007492 A1* | 1/2017 | Yamamoto | A61H 3/04 | |

FOREIGN PATENT DOCUMENTS

| | | |
|---|---|---|
| GB | 2426963 A | 12/2006 |
| JP | 2001-087024 A | 4/2001 |
| JP | 2002-087269 A | 3/2002 |
| JP | 2007-125203 A | 5/2007 |
| JP | 2015-208404 A | 11/2015 |
| WO | WO-2014045857 A1 | 3/2014 |

* cited by examiner

CARRIER APPARATUS

CROSS REFERENCE TO RELATED APPLICATION

This application is based on and incorporates herein by reference Japanese Patent Application No. 2014-90443 filed on Apr. 24, 2014.

TECHNICAL FIELD

The present disclosure relates to a carrier apparatus that has wheels and is suitable for carrying goods.

BACKGROUND

One of such a carrier apparatus for carrying goods is a suitcase that has one or more power assisted wheels. For example, JP2001-87024A discloses this type of suitcase that includes a case main body (also referred to as a case body), wheels, a handle and a force sensor. The case main body can receive the goods. The wheels are installed to a lower portion of the case main body, and one of the wheels, which is placed at a front side of the main body, serves as a driving wheel that is driven by an electric motor. The handle is installed to an upper portion of the case main body. The force sensor is installed to the handle. When the user pulls the handle while the wheels are in contact with a ground, a force, which is applied from a hand of the user to the handle, is sensed with the force sensor. The electric motor is driven based on a value of the force that is sensed with the force sensor. Therefore, the driving wheel is rotated at a speed that corresponds to the pulling force, which is applied from the user to the handle, and thereby an assist force is provided for driving the suitcase.

Furthermore, there is also known a technique of sensing a forward tilt angle of a suitcase and controlling an assist force based on the sensed forward tilt angle of the suitcase (see, for example, JP2007-125203A).

The above techniques are premised on that the suitcase is pulled by the user in the state where the suitcase is tilted forward toward the front side of the suitcase. However, besides the above-described case where the suitcase is pulled by the user, there is a case where the user is located on a side of the suitcase and runs together with the suitcase while the user is pushing the suitcase. Particularly in a case of a large suitcase, which is too large to be pulled, it is preferred to push the suitcase at the time of moving the suitcase. In such a case, an appropriate way of driving the wheels of the large suitcase needs to be provided.

SUMMARY

The present disclosure is made in view of the above point. According to the present disclosure, there is provided a carrier apparatus that includes a case body, at least one drive device, at least one driving wheel, at least one non-driving wheel, a control device and an angle sensing device. The case body has a receiving space in an inside of the case body. The at least one driving wheel is installed to a lower portion of the case body and is driven by the at least one drive device. The at least one non-driving wheel is installed to the lower portion of the case body. The control device controls a drive operation of the at least one drive device. The angle sensing device senses a tilt angle of the case body about a rotational axis of the at least one driving wheel. In a case where the tilt angle of the case body, which is sensed with the angle sensing device, is equal to or larger than a predetermined tilt angle in a state where the at least one driving wheel contacts a ground while the at least one non-driving wheel is lifted away from the ground, the control device controls the at least one drive device in such a manner that the case body is held in a self-standing state with the at least one driving wheel while keeping the at least one non-driving wheel away from the ground.

BRIEF DESCRIPTION OF THE DRAWINGS

The drawings described herein are for illustration purposes only and are not intended to limit the scope of the present disclosure in any way.

DETAILED DESCRIPTION

Embodiments of the present disclosure will now be described with reference to the accompanying drawings. In each of the following embodiments, similar components will be indicated by the same reference sign or the same reference sign plus an additional character to avoid redundant description of the similar components. Furthermore, in each of the following embodiments, in a case where only a portion(s) of a structure is described, the rest of the structure may be the same as that of a previous one of the embodiments. Furthermore, besides the combination of the components described in each of the following embodiments, the components of the following embodiments may be freely combined together as long as such a combination does not pose a particular disadvantage.

First Embodiment

A first embodiment of the present disclosure will be described with reference to FIGS. 1 to 7. A carrier apparatus 10 of the present embodiment includes four wheels and is suitably used for carrying goods. The carrier apparatus 10 is implemented by a suitcase that has power assisted wheels. Specifically, with reference to FIGS. 1 and 4, the carrier apparatus 10 includes a case body 11, a right drive device (also referred to as a first drive device) 12, a left drive device (also referred to as a second drive device) 13, a right driving wheel (also referred to as a first driving wheel) 22, a left driving wheel (also referred to as a second driving wheel) 23, two non-driving wheels (also referred to as first and second non-driving wheels) 14, a manipulating device (also referred to as an operating device) 15, a control device 16, an angle sensing device 17, a ground contact sensing device 18, an electric power source 19 and a handle 20.

The case body 11 is a container that is shaped into a cuboid form and has a receiving space 11a therein for receiving the goods. The case body 11 has an opening portion that is openable and closable. In the following discussion, in a view taken from the front side of the case body 11 (i.e., a view of FIG. 1 or FIG. 5), a direction along a long side of the case body 11 will be referred to as a top-to-bottom direction Z, and a direction along a short side of the case body 11 will be referred to as a front-to-back direction X. Additionally, a direction, which is perpendicular to the top-to-bottom direction Z and the front-to-back direction X, will be referred to as a left-to-right direction Y.

Figure 2:
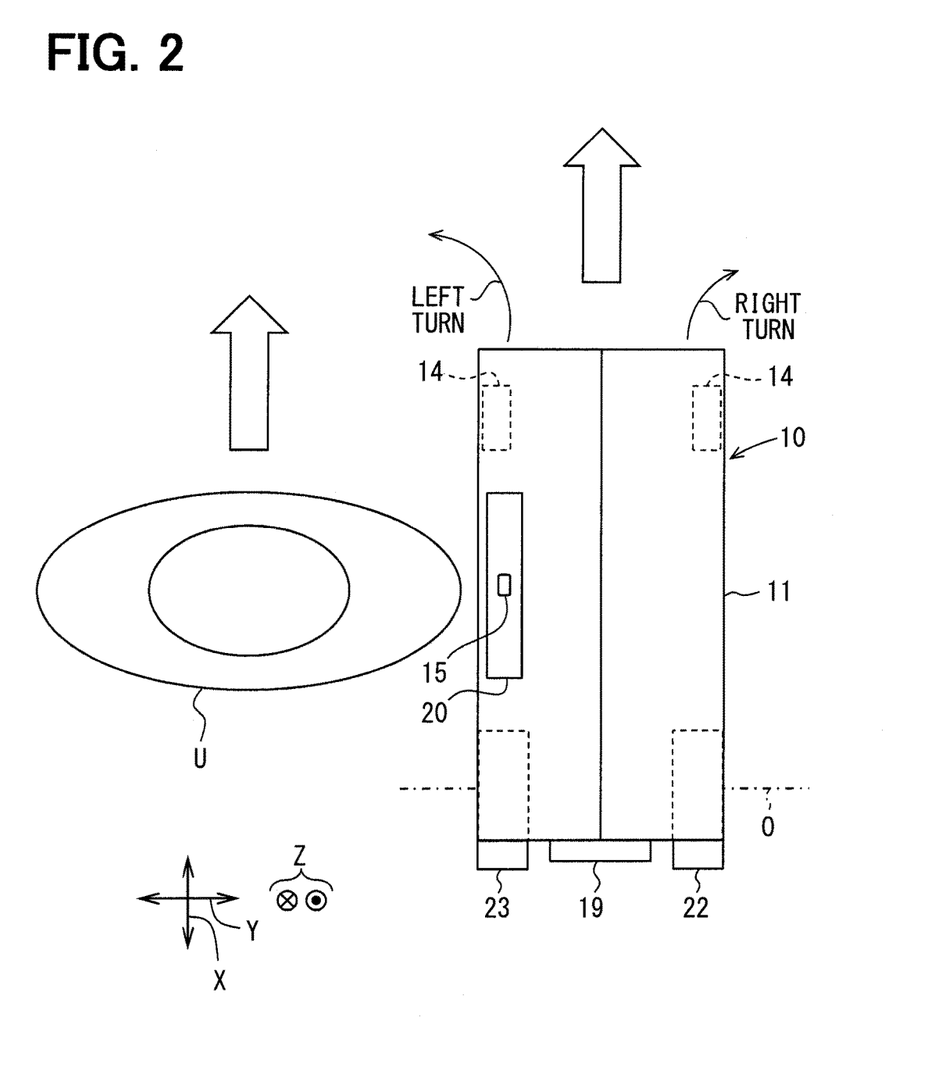
FIG. 2 is a plan view of the carrier apparatus of the first embodiment.

As shown in FIG. 2, the handle 20 is placed at one of a left side and a right side of the case body 11 in the left-to-right direction Y in a view taken from an upper side of the case body 11. More specifically, in the present embodiment, the handle 20 is placed at the left side of the case body 11 and extends from the case body 11 toward the upper side. The handle 20 is installed to the case body 11 in such a manner that the handle 20 is extendable and contractible relative to the case body 11. Thus, when the handle 20 is not in use, the handle 20 may be contracted and received in the case body 11. At the time of using the handle 20, the handle 20 may be extended from the case body 11 and is used by a user U as a handle to pull or carry the case body 11.

The manipulating device 15 is installed to the handle 20. The manipulating device 15 is manipulatable by the user U to input operational information (also referred to as an operational command) for driving the drive devices 12, 13 to rotate the driving wheels 22, 23, which are coaxial with each other, about a rotational axis O that is common to the driving wheels 22, 23. The manipulating device 15 may be a stick (a stick lever) that is tiltable about a base (a default center) of the stick, and the carrier apparatus 10 will be driven in a corresponding direction, toward which the stick is tilted.

The angle sensing device 17 is installed to an upper portion of the case body 11 and senses a tilt angle of the case body 11 relative to the vertical axis (also referred to as the plumb axis or the plumb line). The angle sensing device 17 outputs the measurement information (the measured angle) to the control device 16. In the present embodiment, with reference to FIG. 5, the tilt angle of the case body 11 is defined as an angle θ of a top-to-bottom axis A (an axis that extends in the top-to-bottom direction Z) of the case body 11 relative to the vertical axis V about the rotational axis O of the driving wheels 22, 23. Thus, in the state of the carrier apparatus 10 shown in FIG. 1, the tilt angle θ is 0 (zero) degrees. When the case body 11 is tilted toward the back side (the right side in FIG. 1) from the state shown in FIG. 1, the tilt angle θ is increased. The angle sensing device 17 is implemented by, for example, an acceleration sensor (also referred to as an accelerometer) and a geomagnetic sensor (also referred to as a magnetometer).

The acceleration sensor senses an acceleration of the acceleration sensor itself. For instance, the acceleration sensor senses a change in a speed per second. Furthermore, the acceleration sensor may sense acceleration in the gravitational direction, i.e., a gravitational acceleration to sense movement of the case body 11 and/or vibration of the case body 11. Furthermore, the acceleration sensor may be a three-axis acceleration sensor (also referred to as a three-axis accelerometer). In the case where the acceleration sensor is the three-axis acceleration sensor, acceleration sensor can sense a degree of horizontality of the case body 11. The geomagnetic sensor senses an absolute orientation of the case body 11.

The ground contact sensing device 18 senses whether the driving wheels 22, 23 are in contact with the ground G. The ground contact sensing device 18 outputs the measurement information to the control device 16. For instance, a pressure sensor is installed to each of the driving wheels 22, 23 to sense whether the driving wheels 22, 23 are forced to contact with the ground G by at least the weight of the case body 11.

Figure 3:
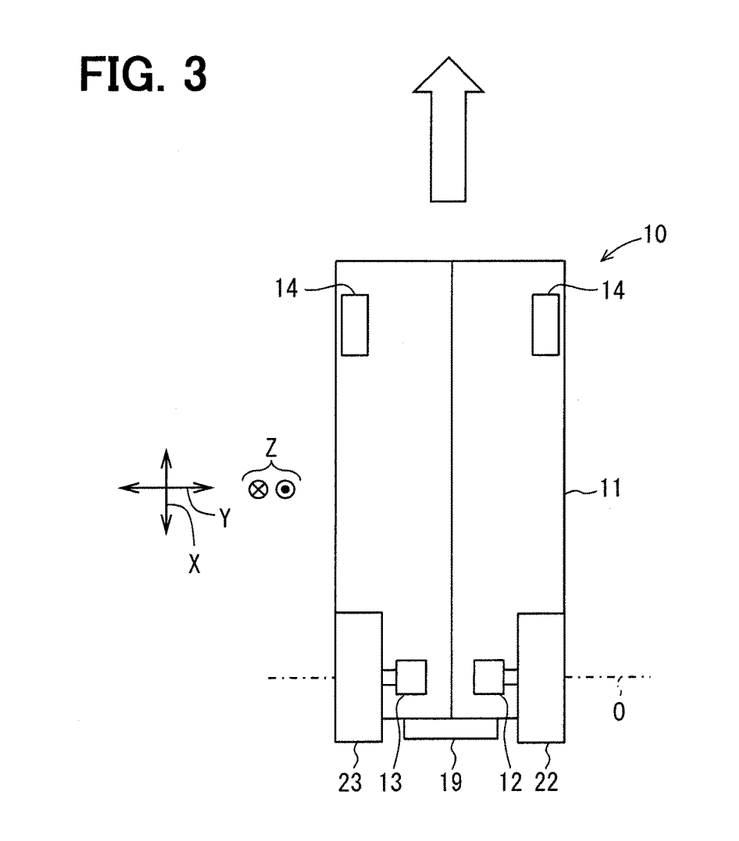
FIG. 3 is a bottom view of the carrier apparatus of the first embodiment.

As shown in FIG. 3, the right driving wheel 22 and the left driving wheel 23 are installed to a lower back side of the case body 11 and are rotatable about the rotational axis O thereof that is parallel to the ground G (also parallel to the horizontal direction in the case where the ground G is parallel to the horizontal direction). The right drive device 12 drives the right driving wheel 22 to rotate the same. The left drive device 13 drives the left driving wheel 23 to rotate the same. Each of the drive devices 12, 13 is an electric motor and is independently operable by the control device 16. Therefore, the amount of rotation and the rotational direction of the left drive device 13 and the amount of rotation and the rotational direction of the right drive device 12 can be individually controlled.

The electric power source 19 supplies the electric power to the drive devices 12, 13, the control device 16, the manipulating device 15, the angle sensing device 17 and the ground contact sensing device 18. The electric power source 19 may be a rechargeable battery, such as a nickel-metal hydride battery, a lithium-ion battery. The electric power source 19 can be charged with an electric power supplied from an external electric power source, and the charged electric power can be discharged from the electric power source 19.

Figure 1:
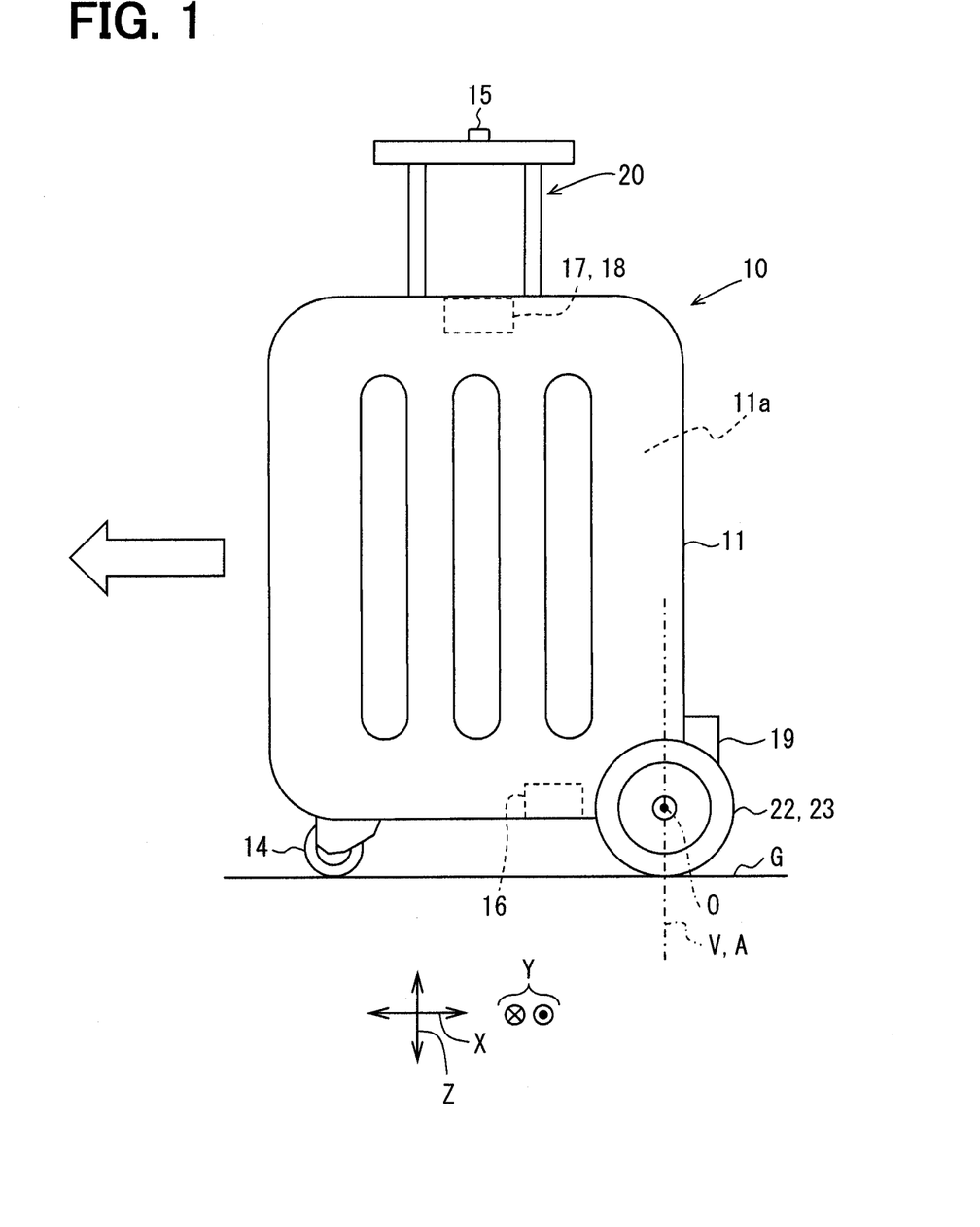
FIG. 1 is a front view of a carrier apparatus according to a first embodiment of the present disclosure.
Figure 5:
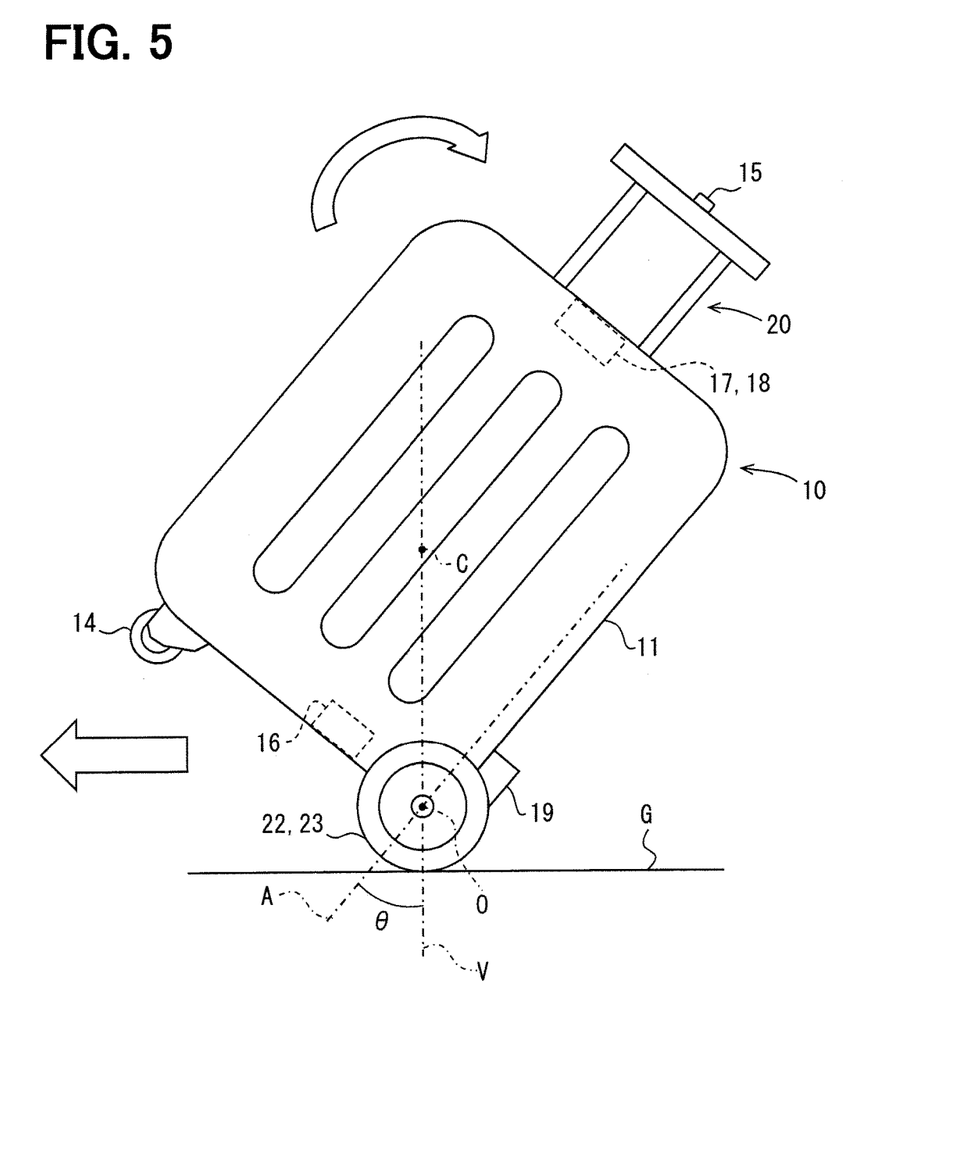
FIG. 5 is a front view of the carrier apparatus of the first embodiment in a self-standing state.

The two non-driving wheels 14 are known as casters and are freely rotatable about a rotational axis thereof that is parallel to the ground G (also parallel to the horizontal direction in the case where the ground G is parallel to the horizontal direction). The two non-driving wheels 14 are installed to a lower front side of the case body 11. The non-driving wheels 14 are equally spaced from the driving wheels 22, 23 in the front-to-back direction X. As shown in FIG. 1, the case body 11 can be stopped in an upright state (a state where the top-to-bottom axis A is directed vertically at an angle of 90 degrees relative to a plane of the ground G) by placing the right driving wheel 22, the left driving wheel 23 and the two non-driving wheels 14 in contact with the ground G that is parallel to the horizontal direction. Furthermore, as shown in FIG. 5, the case body 11 can be placed into the backwardly tilted state by placing the driving wheels 22, 23 in contact with the ground G while lifting the non-driving wheels 14 away from the ground G. In this state, the carrier apparatus 10 can be driven by driving the driving wheels 22, 23.

The control device 16 includes a CPU, a ROM, a RAM and a peripheral device(s). The ROM stores, for example, a program for executing operations of flowcharts described later. The CPU deploys the programs, which are stored in the ROM, into the RAM. The CPU operates according these programs to control the corresponding components. Furthermore, the RAM is used as, for example, a work area of the CPU.

Figure 4:
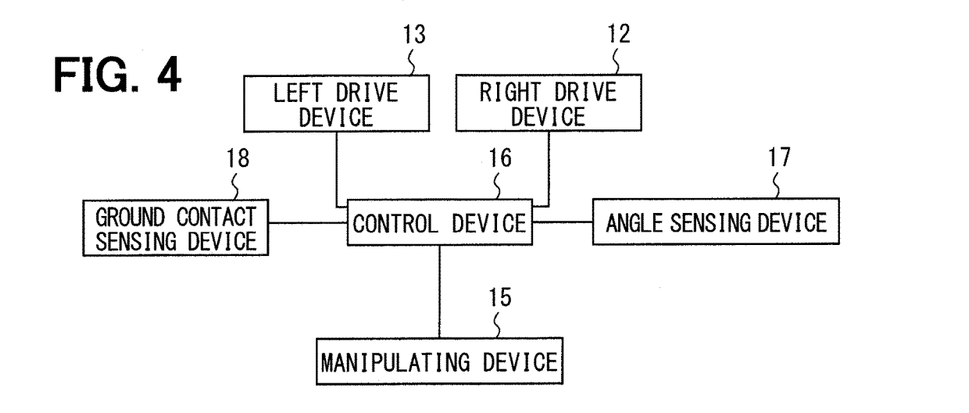
FIG. 4 is a block diagram showing an electrical construction of the carrier apparatus of the first embodiment.

As shown in FIG. 4, the control device 16 receives the measurement information from the ground contact sensing device 18 and the measurement information from the angle sensing device 17. Furthermore, the operational information is supplied from the manipulating device 15 to the control device 16. The control device 16 outputs a drive signal to each of the left drive device 13 and the right drive device 12 to operate the same based on the measurement information and the operational information described above. Thus, the left drive device 13 and the right drive device 12 are individually controlled.

Figure 6:
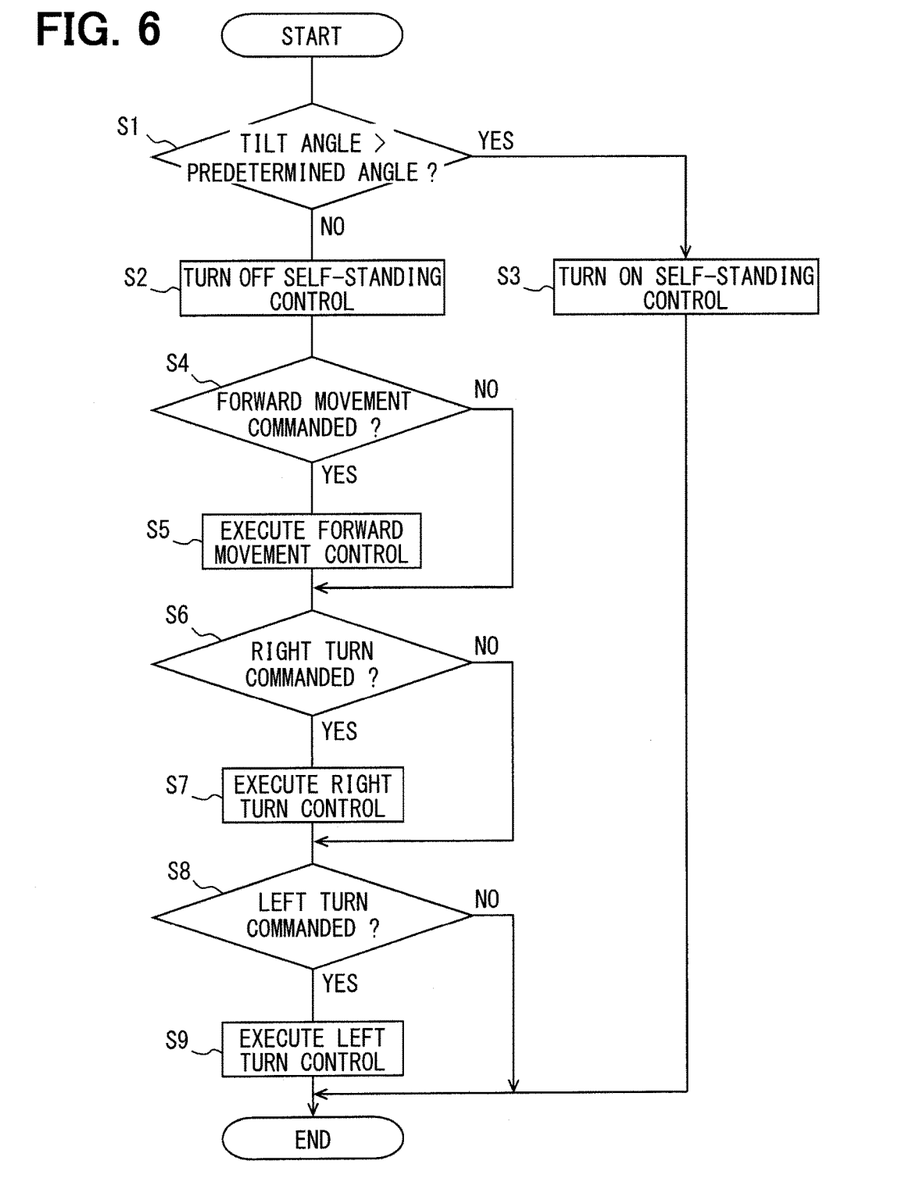
FIG. 6 is a flowchart indicating an operation of a control device of the first embodiment.

Next, the specific control operation of the control device 16 will be described with reference to FIG. 6. The flowchart of FIG. 6 is executed by the control device 16. In a state where the electric power supply is turned on, the control device 16 repeats the operation of the flowchart of FIG. 6 at predetermined short time intervals.

At step S1, it is determined whether the tilt angle θ, which is sensed with the angle sensing device 17, is larger than the predetermined angle. When it is determined that the tilt angle θ is larger than the predetermined angle at step S1 (i.e., YES at step S1), the operation proceeds to step S3. In contrast, when it is determined that the tilt angle θ is not larger than the predetermined angle at step S1 (i.e., NO at step S1), the operation proceeds to step S2. The tilt angle θ is the tilt angle of the case body 11 in the state where the case body 11 is tilted backward, as discussed above. Thus, when the tilt angle θ of the case body 11 about the rotational axis O of the driving wheels 22, 23 relative to the vertical axis V is larger than the predetermined angle in the state where the driving wheels 22, 23 are in contact with the ground G while the non-driving wheels 14 are lifted away from the ground, the operation proceeds to step S3. The predetermined angle may be, for example, 40 degrees.

At step S3, since the tilt angle θ is larger than the predetermined angle, the non-driving wheels 14 are not in contact with the ground. Thus, at step S3, a self-standing control operation (self-standing control mode) is executed, and thereafter the operation of the flowchart shown in FIG. 6 is terminated. The self-standing control operation (self-standing control mode) is an operation (mode) that maintains a self-standing state of the case body 11 wherein the driving wheels 22, 23 are driven by controlling the drive devices 12, 13 while the non-driving wheels 14 are lifted away from the ground G. This control operation maintains the standing state of the case body 11 and is also referred to as an inverted pendulum control (implementing a pendulum that has its center of mass above a pivot point thereof). FIG. 5 indicates the self-standing state of the case body 11 implemented by the inverted pendulum control where the center of mass C of the case body 11 is placed above the pivot point (the rotational axis O) along the vertical axis V.

In the self-standing control operation (self-standing control mode), the location of the center of mass C of the case body 11 is repeatedly computed based on the information sensed with the angle sensing device 17. In a case where the center of mass C of the case body 11 is in a neutral position (a position shown in FIG. 5), the control device 16 drives the drive devices 12, 13 according to a control process that is based on the inverted pendulum control principle to maintain the center of mass C of the case body 11 in the neutral position. For example, in the view taken from the front side of the case body 11 (i.e., the view of FIG. 5), the neutral position is above the rotational axis O of the driving wheels 22, 23 along the vertical axis V. In the self-standing control operation (self-standing control mode), when the center of mass C of the case body 11 is displaced toward the front side of the neutral position, the control device 16 drives the drive devices 12, 13 at the same rotational speed to drive the carrier apparatus 10 toward the front side by executing the control process based on the inverted pendulum control principle. Similarly, when the center of mass C of the case body 11 is displaced toward the back side of the neutral position, the control device 16 drives the drive devices 12, 13 at the same rotational speed to drive the carrier apparatus 10 toward the back side by executing the control process based on the inverted pendulum control principle.

At step S2, since the tilt angle θ is not larger than the predetermined angle, the self-standing control operation (self-standing control mode) is turned off (or is kept off). Then, the operation proceeds to step S4. The turning off of the self-standing control operation may be implemented through operation of the manipulating device 15 by the user U. Furthermore, when the ground contact sensing device 18 senses that the driving wheels 22, 23 are not in contact with the ground G, the self-standing control operation is also turned off. Furthermore, the driving wheels 22, 23 are also stopped.

At step S4, it is determined whether the manipulating device 15 is manipulated to execute the forward movement of the carrier apparatus 10 (i.e., whether the forward movement is commanded). When it is determined that the manipulating device 15 is manipulated to execute the forward movement of the carrier apparatus 10 at step S4 (i.e., YES at step S4), the operation proceeds to step S5. In contrast, when it is determined that the manipulating device 15 is not manipulated to execute the forward movement of the carrier apparatus 10 at step S4 (i.e., NO at step S4), the operation proceeds to step S6. At step S5, since the manipulating device 15 is manipulated to execute the forward movement of the carrier apparatus 10, the control device 6 drives the drive devices 12, 13 at the same rotational speed to move the carrier apparatus 10 toward the front side (i.e., executing the forward movement control). Thereafter, the operation proceeds to step S6.

At step S6, it is determined whether the manipulating device 15 is manipulated to execute a right turn of the carrier apparatus 10 (i.e., whether the right turn is commanded). When it is determined that the manipulating device 15 is manipulated to execute the right turn of the carrier apparatus 10 at step S6 (i.e., YES at step S6), the operation proceeds to step S7. In contrast, when it is determined that the manipulating device 15 is not manipulated to execute the right turn of the carrier apparatus 10 at step S6 (i.e., NO at step S6), the operation proceeds to step S8. At step S7, since the manipulating device 15 is manipulated to execute the right turn of the carrier apparatus 10, the control device 6 executes a right turn control operation. Thereafter, the operation proceeds to step S8.

In the right turn control operation, the control device 16 controls the drive devices 12, 13 such that the amount of rotation of the right drive device 12 is reduced in comparison to the amount of rotation of the left drive device 13 to rotate the carrier apparatus 10 toward the right side. The control device 16 controls the drive devices 12, 13 such that a turning radius of the carrier apparatus 10 at the time of executing the right turn of the carrier apparatus 10 is smaller than a turning radius of the carrier apparatus 10 at the time of executing the left turn of the carrier apparatus 10. In other words, the control device 16 controls the drive devices 12, 13 in such a manner that the right turn makes a smaller turning circle in comparison to the left turn. As shown in FIG. 2, since the handle 20 is placed at the left side of the case body 1, the user U is also located on the left side of the case body 1. Thus, the left turn of the carrier apparatus 10 requires the larger turning circle in comparison to the right turn. This is the reason why the turning radius of the carrier apparatus 10 at the time of executing the right turn of the carrier apparatus 10 is made smaller than the turning radius of the carrier apparatus 10 at the time of executing the left turn of the carrier apparatus 10.

At step S8, it is determined whether the manipulating device 15 is operated to execute the left turn of the carrier apparatus 10 (i.e., whether the left turn is commanded). When it is determined that the manipulating device 15 is operated to execute the left turn of the carrier apparatus 10 at step S8 (i.e., YES at step S8), the operation proceeds to step S9. In contrast, when it is determined that the manipulating device 15 is not operated to execute the left turn of the carrier apparatus 10 at step S8 (i.e., NO at step S8), the operation of the flowchart of FIG. 6 is terminated.

In the left turn control operation of step S9, the control device 16 controls the drive devices 12, 13 such that the amount of rotation of the right drive device 12 is larger than the amount of rotation of the left drive device 13 to make the left turn of the carrier apparatus 10. Furthermore, the control device 16 controls the drive devices 12, 13 such that the turning radius of the carrier apparatus 10 at the time of making the left turn of the carrier apparatus 10 is larger than the turning radius of the carrier apparatus 10 at the time of executing the right turn of the carrier apparatus 10. In other words, the control device 16 controls the drive devices 12, 13 in such a manner that the left turn makes the larger turning circle in comparison to the right turn. As discussed above, since the handle 20 is placed at the left side of the case body 1, the user U is also located on the left side of the case body 1. Thus, the left turn of the carrier apparatus 10 requires the larger turning circle in comparison to the right turn. This is the reason why the control device 16 controls the drive devices 12, 13 in such a manner that the left turn makes the larger turning circle in comparison to the right turn.

Figure 7:
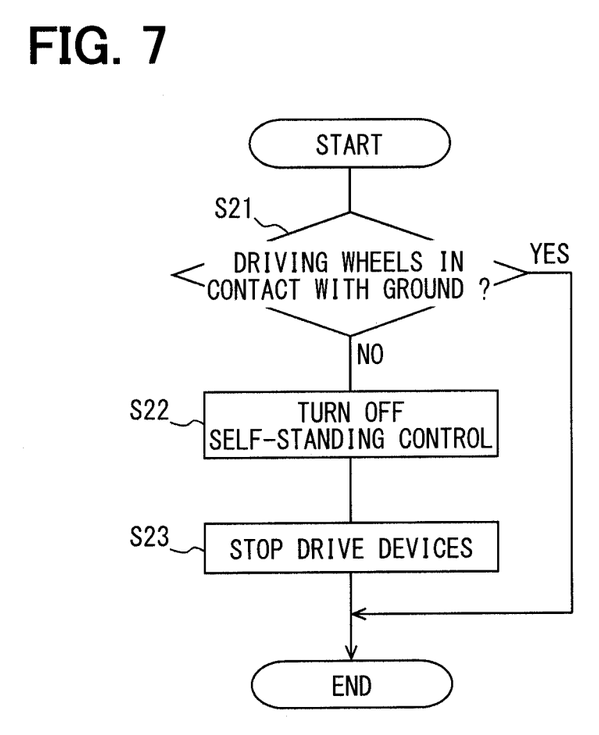
FIG. 7 is a flowchart of a self-standing control operation of the control device according to the first embodiment.

Next, a self-standing control operation (self-standing control mode) of the control device 16 will be described with reference to FIG. 7. A flowchart of FIG. 7 is executed by the control device 16. The control device 16 repeats the operation of the flowchart of FIG. 7 at predetermined short time intervals.

At step S21, it is determined whether the two driving wheels 22, 23 are in contact with the ground G through the ground contact sensing device 18. When it is determined that the driving wheels 22, 23 are not in contact with the ground G at step S21 (i.e., NO at step S21), the operation proceeds to step S22. In contrast, when it is determined that the driving wheels 22, 23 are in contact with the ground G at step S21 (i.e., YES at step S21), the operation of the flowchart of FIG. 7 is terminated.

At step S22, since the driving wheels 22, 23 are not in contact with the ground G, the self-standing control operation (the self-standing control mode) is turned off, and the operation proceeds to step S23. At step S23, the control device 16 controls the drive devices 12, 13 to stop the same. Then, the operation of the flowchart of FIG. 7 is terminated.

Thereby, in the case where the carrier apparatus 10 is lifted from the ground G, the drive devices 12, 13 are stopped. Therefore, at the time of, for example, putting the carrier apparatus 10 into a vehicle, it is possible to limit the unintentional operation of the drive devices 12, 13. Furthermore, when it is required to immediately turn off the self-standing control operation (the self-standing control mode), the self-standing control operation (the self-standing control mode) can be immediately turned off by simply lifting the carrier apparatus 10.

As discussed above, in the carrier apparatus 10 of the present embodiment, the two driving wheels 22, 23, which are placed at the lower back side of the case body 11, can be operated through the manipulating device 15. Thereby, the carrier apparatus 10, which includes the case body 11, can be easily moved by driving the driving wheels 22, 23 in the state where the two non-driving wheels 14 and the two driving wheels 22, 23 are in contact with the ground G. Furthermore, the drive devices 12, 13 are controlled by the control device 16 in such a manner that the case body 11 is placed into the self-standing state when the case body 11 is tilted toward the driving wheel 22, 23 side, i.e., toward the back side. Thereby, the carrier apparatus 10, which includes the case body 11, can be driven in the state where the non-driving wheels 14 are lifted away from the ground G. Therefore, the carrier apparatus 10, which includes the case body 11, can be more smoothly moved due to absence of rotational resistance of the non-driving wheels 14. As a result, it is possible to implement the carrier apparatus 10, which is suitable for side-by-side running with the user U.

Furthermore, according to the present embodiment, when the case body 11 is tilted in one of the front side and the back side by an external force in a state where the case body 11 is held in the self-standing state by the control device 16, the control device 16 controls the drive devices 12, 13 such that the drive devices 12, 13 drive the driving wheels 22, 23 to move the carrier apparatus 10 toward the one of the front side and the back side while maintaining the self-standing state of the case body 11. Therefore, the carrier apparatus 10, which includes the case body 11, can be intuitively moved by the user U through the self-standing control operation (self-standing control mode). In other words, the moving direction of the carrier apparatus 10, which includes the case body 11, can be changed to a desired direction by intentionally losing the balance of the case body 11. Furthermore, the moving speed of the carrier apparatus 10, which includes the case body 11, may be changed based on, for example, a magnitude of the external force applied to the case body 11 to tilt the case body 11.

Furthermore, according to the present embodiment, in the case where the manipulating device 15 is operated to execute the left turn or the right turn, the drive devices 12, 13 are operated such that the turning radius of the turn toward the handle side, at which the handle 20 is located, is smaller than the turning radius of the turn toward the opposite side, which is opposite from the handle side. In this way, although the user U walks on the handle side (the left side of the case body 11), at which the handle 20 is located, the user U can easily follow the right turn or the left turn of the carrier apparatus 10. Therefore, the carrier apparatus 10, which includes the case body 11, can be intuitively moved by the user U toward the desired direction (i.e., one of the left turn direction and the right turn direction).

Furthermore, according to the present embodiment, in the case where the ground contact sensing device 18 senses that the driving wheels 22, 23 are not in contact with the ground G, the control device 16 controls the drive devices 12, 13 such that the rotations of the driving wheels 22, 23 are stopped. Therefore, it is possible to limit the unintentional operation of the drive devices 12, 13 at the time of lifting the carrier apparatus 10.

Furthermore, in the present embodiment, the two non-driving wheels 14, the right driving wheel 22 and the left driving wheel 23 are installed to the lower portion of the case body 11. Therefore, since the case body 11 is supported with the four wheels, the case body 11 can be moved in a stable manner.

Second Embodiment

Figure 8:
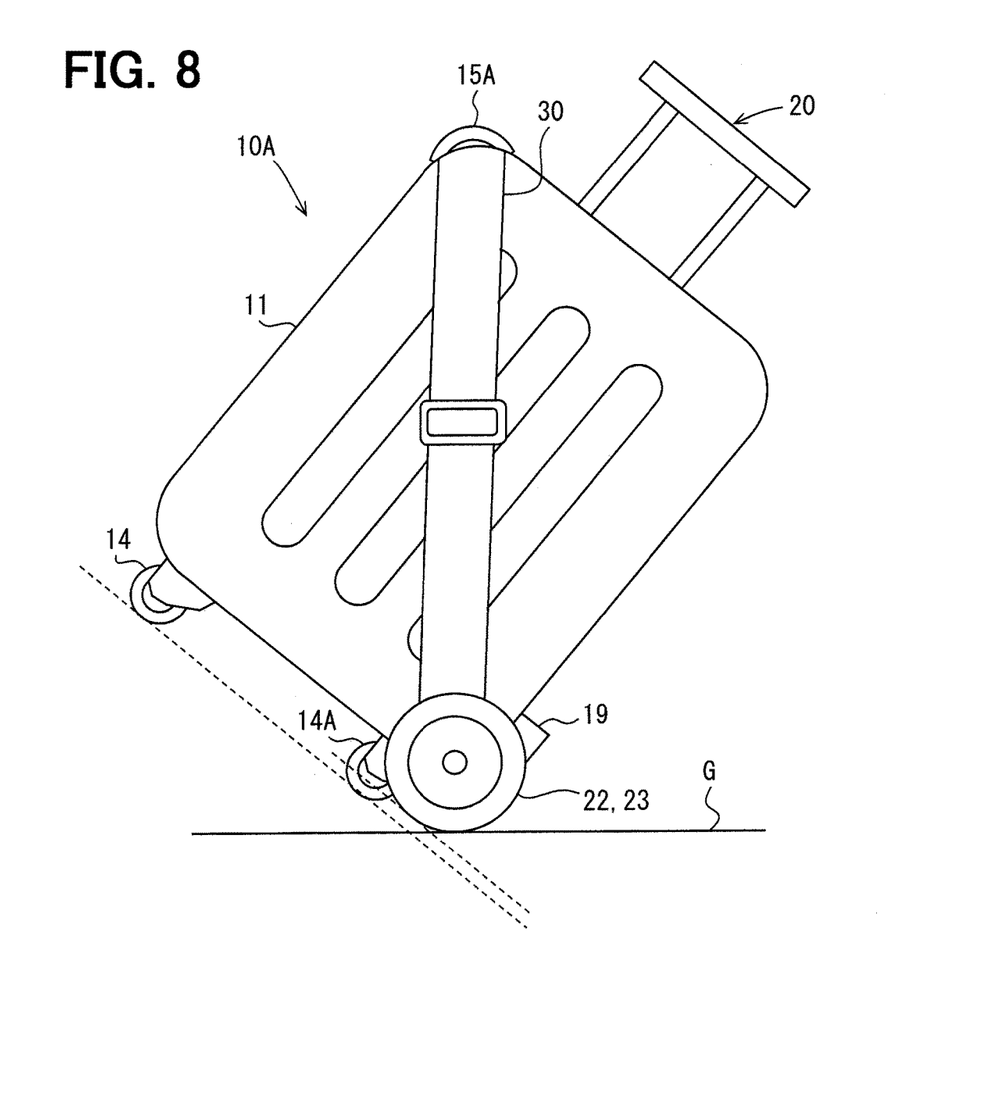
FIG. 8 is a front view of a carrier apparatus according to a second embodiment of the present disclosure.

Next, a carrier apparatus 10A according to a second embodiment of the present disclosure will be described with reference to FIG. 8. The present embodiment is characterized by a detachable construction of the two driving wheels 22, 23, which are detachably installed to the case body 11.

In the present embodiment, the drive devices 12, 13, the driving wheels 22, 23, the manipulating device 15, the control device 16 and the angle sensing device 17 are integrally constructed as one detachable unit that is detachable to the case body 11. The case body 11 is a pre-existing suitcase that has four non-driving wheels (more specifically, two front side non-driving wheels 14 and two back side non-driving wheels 14A). The driving wheels 22, 23 are installed to the case body 11 of this suitcase by a band 30 in a manner shown in FIG. 8. At the time of installing the driving wheels 22, 23 to the case body 11, the locations of the driving wheels 22, 23 are adjusted such that the two non-driving wheels 14A, which are located at the back side, do not touch the ground G when the case body 11 is tilted toward the back side. Thereby, in the case where the case body 11 is tilted toward the back side in a manner similar to that of FIG. 5 of the first embodiment, only the two driving wheels 22, 23 contact the ground G while the two front side non-driving wheels 14 and the two back side non-driving wheels 14A are lifted away from the ground G.

Furthermore, a touch sensor 15A, which functions as the manipulating device 15, is installed at the top side of the band 30. The touch sensor 15A senses contact of the hand of the user to the touch sensor 15A. When the case body 11 is tilted toward the front side or the back side in the state where the hand of the user touches the touch sensor 15A, it will cause the loss of the balance of the case body 11. Therefore, the control device 16 drives the drive devices 12, 13 for executing the self-standing control operation, and thereby the carrier apparatus 10A is driven toward the front side or the back side.

As discussed above, according to the present embodiment, the drive devices 12, 13, the driving wheels 22, 23, the manipulating device 15, the control device 16 and the angle sensing device 17 are detachably installed to the case body 11. Therefore, the carrier apparatus 10 of the first embodiment can be implemented by using the pre-existing suitcase.

Other Embodiments

The embodiments of the present disclosure have been described. However, the present disclosure should not be limited to the described embodiments, and the described embodiments may be modified in various ways within the principle of the present disclosure.

The structures of the above embodiments are mere exemplary structures, and the scope of the present disclosure should not be limited to these structures. The scope of the present disclosure is indicated by the claims of the present application and should include all of modifications that are equivalent to those recited in the claims.

For instance, in the first embodiment, the number of the non-driving wheels 14 is two. However, the number of the non-driving wheels should not be limited to two and may be changed to one or three or more. Furthermore, in the first embodiment, the number of the driving wheels 22, 23 is two. However, the number of the driving wheels should not be limited to two and may be changed to one or three or more.

Furthermore, in the first embodiment, the driving wheels 22, 23 are located at the back side of the case body 11. Alternatively, the driving wheels 22, 23 may be installed to the front side of the case body 11 while the non-driving wheels are installed to the back side of the case body 11. In the case where the driving wheels 22, 23 are installed to the front side of the case body 11, the case body 11 may be tilted toward the front side, so that the case body 11 may be pulled by the user through the handle 20. Further alternatively, the driving wheels 22, 23 may be placed at the center of the lower portion of the case body 11, which is centered in the front-to-back direction X. In the case where the driving wheels 22, 23 are installed to the center of the case body 11 at the lower portion of the case body 11, the case body 11 may be used like a unicycle. Therefore, in the state where the lower portion of the case body 11 is plateaued (i.e., is held flat in the horizontal direction), the non-driving wheels 14 do not contact with the ground G, and only the driving wheels 22, 23 contact the ground. Therefore, when the case body 11 is tilted to touch the non-driving wheels 14 to the ground G, the case body 11 is placed into a basic operational position (a basic posture). When the case body 11 is tilted from this basic operational position about the rotational axis of the driving wheels 22, 23 to lift the non-driving wheels 14 from the ground G at a tilt angle that is larger than (or equal to or larger than) the predetermined angle, the control device 16 executes the self-standing control operation (the self-standing control mode).

In the first embodiment, the manipulating device 15 is installed to the handle 20. Alternatively, the manipulating device 15 may be eliminated from the carrier apparatus 10. In the case where the carrier apparatus 10 does not have the manipulating device 15, the carrier apparatus 10 cannot be moved through the operation of the manipulating device 15. However, in such a case, the movement of the carrier apparatus 10 can be controlled by tilting the case body 11. Thus, the elimination of the manipulating device 15 can simplify the structure of the carrier apparatus 10.

In the second embodiment, the carrier apparatus 10 includes the case body 11. Alternatively, the case body 11 may be eliminated from the carrier apparatus 10, and the carrier apparatus 10 may include a separate portion that is separate from the case body 11. Therefore, for instance, the carrier apparatus 10 may be a trolley (e.g., a small table or base on casters), and the band 30 of the second embodiment may be replaced with a rod member that has a required rigidity. Furthermore, the table or base of the trolley may be eliminated. In such a case, the band 30 of the second embodiment may be in a rod form, and the non-driving wheels 14 and the driving wheels 22, 23 are provided in the carrier apparatus 10. In such a case, the carrier apparatus 10 may be like a stick that does not tumble through the self-standing control operation (the self-standing control mode) of the carrier apparatus 10.

What is claimed is:

1. A carrier apparatus comprising:
a case body that has a receiving space in an inside of the case body;
at least one drive device;
at least one driving wheel that is installed to a lower portion of the case body and is driven by the at least one drive device;
at least one non-driving wheel that is installed to the lower portion of the case body;
a control device that controls a drive operation of the at least one drive device;
an angle sensing device that senses a tilt angle of the case body about a rotational axis of the at least one driving wheel, wherein in a case where the tilt angle of the case body, which is sensed with the angle sensing device, is equal to or larger than a predetermined tilt angle in a state where the at least one driving wheel contacts a ground while the at least one non-driving wheel is lifted away from the ground, the control device controls the at least one drive device in such a manner that the case body is held in a self-standing state with the at least one driving wheel while keeping the at least one non-driving wheel away from the ground;

a handle that is placed at one of a left side and a right side of the case body in a left-to-right direction, which is perpendicular to a front-to-back direction in a view taken from an upper side of the case body, wherein the handle extends from the case body toward the upper side; and a manipulating device that is installed to the handle and is manipulatable by a user of the carrier apparatus to drive the at least one drive device, wherein when the manipulating device is operated to make a left turn or a right turn of the carrier apparatus at a time of moving the carrier apparatus toward a front side, the control device controls the at least one drive device such that a turning radius of the carrier apparatus at a time of turning the carrier apparatus toward the one of the left side and the right side, at which the handle is placed, is larger than a turning radius of the carrier apparatus at a time of turning the carrier apparatus toward another one of the left side and the right side.

2. The carrier apparatus according to claim 1, wherein when the case body is tilted in one of the front side and a back side by an external force in a state where the case body is held in the self-standing state by the control device, the control device controls the at least one drive device such that the at least one drive device drives the at least one driving wheel to move the carrier apparatus toward the one of the front side and the back side while maintaining the self-standing state of the case body.

3. The carrier apparatus according to claim 1, further comprising a ground contact sensing device that senses whether the at least one driving wheel is in contact with the ground, wherein in a case where the ground contact sensing device senses that the at least one driving wheel is not in contact with the ground, the control device controls the at least one drive device in such a manner that the at least one drive device stops the at least one driving wheel.

4. The carrier apparatus according to claim 1, wherein the at least one drive device, the at least one driving wheel, the control device and the angle sensing device are detachable from the case body.

5. The carrier apparatus according to claim 1, wherein:
the at least one drive device includes first and second drive devices; and
the at least one driving wheel includes first and second driving wheels, which are coaxial with each other and are driven by the first and second drive devices, respectively, to rotate about the rotational axis that is common to the first and second driving wheels.

6. A carrier apparatus comprising:
a case body that has a receiving space in an inside of the case body;
at least one drive device;
at least one driving wheel that is installed to a lower portion of the case body and is driven by the at least one drive device;
at least one non-driving wheel that is installed to the lower portion of the case body;
a control device that controls a drive operation of the at least one drive device;

an angle sensing device that senses a tilt angle of the case body about a rotational axis of the at least one driving wheel;

a touch sensor that senses contact of a body of a user to the touch sensor, wherein in a case where the tilt angle of the case body, which is sensed with the angle sensing device, is equal to or larger than a predetermined tilt angle in a state where the touch sensor senses the contact of the body of the user to the touch sensor, and the at least one driving wheel contacts a ground while the at least one non-driving wheel is lifted away from the ground, the control device controls the at least one drive device in such a manner that the case body is held in a self-standing state with the at least one driving wheel while keeping the at least one non-driving wheel away from the ground;

a handle that is placed at one of a left side and a right side of the case body in a left-to-right direction, which is perpendicular to a front-to-back direction in a view taken from an upper side of the case body, wherein the handle extends from the case body toward the upper side; and a manipulating device that is installed to the handle and is manipulatable by a user of the carrier apparatus to drive the at least one drive device, wherein when the manipulating device is operated to make a left turn or a right turn of the carrier apparatus at a time of moving the carrier apparatus toward a front side, the control device controls the at least one drive device such that a turning radius of the carrier apparatus at a time of turning the carrier apparatus toward the one of the left side and the right side, at which the handle is placed, is larger than a turning radius of the carrier apparatus at a time of turning the carrier apparatus toward another one of the left side and the right side.

7. The carrier apparatus according to claim 6, wherein when the case body is tilted in one of the front side and a back side by an external force in a state where the case body is held in the self-standing state by the control device, the control device controls the at least one drive device such that the at least one drive device drives the at least one driving wheel to move the carrier apparatus toward the one of the front side and the back side while maintaining the self-standing state of the case body.

8. The carrier apparatus according to claim 6, further comprising a ground contact sensing device that senses whether the at least one driving wheel is in contact with the ground, wherein in a case where the ground contact sensing device senses that the at least one driving wheel is not in contact with the ground, the control device controls the at least one drive device in such a manner that the at least one drive device stops the at least one driving wheel.

9. The carrier apparatus according to claim 6, wherein the at least one drive device, the at least one driving wheel, the control device and the angle sensing device are detachable from the case body.

10. The carrier apparatus according to claim 6, wherein:
the at least one drive device includes first and second drive devices; and
the at least one driving wheel includes first and second driving wheels, which are coaxial with each other and are driven by the first and second drive devices, respectively, to rotate about the rotational axis that is common to the first and second driving wheels.

* * * * *